United States Patent
Lin et al.

(10) Patent No.: US 9,116,033 B2
(45) Date of Patent: Aug. 25, 2015

(54) VERIFICATION SYSTEM FOR LARGE-SCALE WEIGHING MACHINE AND SELF-LOCATION LOADING-UNLOADING LOAD MEASURING DEVICE

(75) Inventors: Jianhui Lin, Fuzhou (CN); Jiankang Song, Fuzhou (CN); Jinhui Yao, Fuzhou (CN); Hui Chi, Fuzhou (CN)

(73) Assignee: FUJIAN METROLOGY INSTITUTE, Fuzhou, Fujian (CN)

( * ) Notice: Subject to any disclaimer, the term of this patent is extended or adjusted under 35 U.S.C. 154(b) by 376 days.

(21) Appl. No.: 13/806,777

(22) PCT Filed: May 30, 2011

(86) PCT No.: PCT/CN2011/074863
§ 371 (c)(1),
(2), (4) Date: Jan. 15, 2013

(87) PCT Pub. No.: WO2012/000362
PCT Pub. Date: Jan. 5, 2012

(65) Prior Publication Data
US 2013/0104620 A1    May 2, 2013

(30) Foreign Application Priority Data
Jun. 30, 2010  (CN) .......................... 2010 1 0223475

(51) Int. Cl.
G01G 19/02   (2006.01)
G01G 23/01   (2006.01)

(52) U.S. Cl.
CPC .............. *G01G 23/012* (2013.01); *G01G 19/02* (2013.01); *G01G 23/01* (2013.01)

(58) Field of Classification Search
CPC ...... G01G 23/01; G01G 23/012; G01G 19/02
USPC .................................... 73/1.13; 177/145, 146
See application file for complete search history.

(56) References Cited

U.S. PATENT DOCUMENTS

| | | | | |
|---|---|---|---|---|
| 4,213,509 A | * | 7/1980 | Hafner | 177/199 |
| 4,658,921 A | * | 4/1987 | Karpa | 177/50 |
| 4,848,478 A | * | 7/1989 | Hafner | 177/50 |

* cited by examiner

*Primary Examiner* — Hezron E Williams
*Assistant Examiner* — David Z Huang (57) ABSTRACT

A verification system for a large-scale weighing machine comprises at least four tension frameworks penetrating through a weighing platform hole preset on a weighing platform surface of the weighing machine, for connecting to a weighing platform foundation and being disposed perpendicular to the weighing platform surface, at least four self-adjusting loading-unloading load measuring devices disposed corresponding to the tension frameworks, and a constant-load control device connected with the loading-unloading mechanism and allows the loading-unloading mechanism to maintain constant applied load while loading. The self-adjusting loading-unloading load measuring devices includes a self-adjusting loading-unloading mechanism and a high-precision load measuring instrument adjacent to the top side of the loading-unloading mechanism. The high-precision load measuring instrument is at least three times larger than an accuracy of the weighing machine. The verification system has a rational structure and can greatly improve operating efficiency and safety and save cost.

18 Claims, 9 Drawing Sheets

VERIFICATION SYSTEM FOR LARGE-SCALE WEIGHING MACHINE AND SELF-LOCATION LOADING-UNLOADING LOAD MEASURING DEVICE

BACKGROUND OF THE INVENTION

1. Field of the Invention

The present invention relates to a verification of an electronic weighing machine, particularly to a verification system for a large-scale fixed electronic weighing machine which belongs to a measurement verification technique.

2. Description of the Related Art

A fixed electronic weighing machine is the maturest weighing implement in the world, which is popularly applied to weigh the various vehicles and wares in metallurgical industry, chemical industry, railway, harbor, and industrial and mining enterprises, and also applied to control the weighing procedure of the trading settlement and the producing process. The weighing machine is an ideal weighing implement for the enterprises to enhance the level of modern weighing. The principle of the fixed electronic weighing machine is to set weighed objects or loading vehicles on a weighing platform. Under the effect of weight, the weighing platform transmits the weight to a swinging supporting such as the steel balls and press head, and the flexible unit of the weighing sensor is deformed, which renders a foil gauge bridge-circuit adhered to the flexible unit, lose the balance and output an electric signal in a positive proportion with the weight value. The signal is magnified by a linear magnifier, converted into a digital signal via A/D, and then processed by a microprocessor of a gauge to directly display the weight value.

The fixed electronic weighing machine must be verified to confirm its accurate level before use. The large-scale weighing machine needs to be verified again to ensure its accurate level when using for a time or changing the components thereof so as to correspondingly adjust for satisfying the demand of accuracy. A conventional standard instrument used for fixed electronic weighing machine for verifying is divided into three types. The fixed electronic weighing machine of the standard number stipulated by GB7723-2008 is adopted by the international proposal OIML R76 "The non-automatic weighing machine" (2006E) clearly points out three permitted standard instruments for verifying as follows: 1. a counterweight, concretely to a standard counterweight or a standard quality; 2. an auxiliary verification device, concretely to an auxiliary verification device equipped in the weighing machine or an independent auxiliary verification device; 3. a substitution of the standard counterweight used in verification, concretely to part of the standard counterweights and other substitutions that are able to be irregularly fixed and loaded.

However, the standard instrument for verifying the weighing machine is regulated in the regulation of verification of the digit indicator weighing machine stipulated by JJG539-1997: 1. the standard counterweight; 2. the standard counterweights and the substitutions of the standard counterweights. Therefore, the standard instrument presently used for verifying the fixed electronic weighing machine is the standard counterweights or standard counterweights and its substitutions, and the auxiliary verification weighing machine is not adopted to be a standard instrument for verifying the fixed weighing machine. In the international proposal of R76 "The non-automatic weighing machine" and the fixed electronic weighing machine stipulated by the national standard GB7723-2008, the auxiliary verification device is only regulated as follows: A maximal permissible error of an auxiliary verification device equipped in the weighing machine or an independent auxiliary verification device should be ⅓ of the maximal permissible error of the verification load. What the auxiliary verification device is which is not mentioned in the international proposal and the GB7723-2008, only a maximal permissible error of the auxiliary verification device is regulated. So far, the documents of adopting the independent auxiliary verification device to perform in verifying a large-tonnage fixed weighing machine on the spot have rarely been seen.

Referring to the China patent number CN86105843 published in 17 Feb. 1988, by "A verification device of truck scale and track scale" is disclosed. The prior patent discloses a non-counterweight verification device. However, an accuracy of a piezometer adopted by the verification device cannot satisfy the verification accuracy demand of this type of weighing machine. Referring to the China patent number CN02230837.7 announced in 22 Jan. 2003, by "A large-scale weighing machine verification appearance" is disclosed. The prior patent also discloses a non-counterweight verification device. The prior patent comprises a verification sensor (4), a displaying gauge (7), a pressurizing device, and a pressurizing stand (3). The pressurizing stand integrates with the base used for verifying the weighing scale. The pressurizing device is fixed on the pressurizing stand. The metric accuracies of the verification sensor and the displaying gauge are larger than the metric accuracy of the verified weighing machine. The verification sensor is disposed on the body (9) of weighing machine that needs to be verified. A sphere connects the verification sensor and the pressurizing device. An output end of the verification sensor is connected to the displaying gauge. A pressure of the pressurizing device is applied on the sensor and displayed by the displaying gauge, concurrently, the pressure is also applied on the body of weighing machine needed to be verified and displayed by the displaying gauge, so the metric error of the verified weighing machine is able to be confirmed by comparing the displaying values. The verification device only verifies the in-service sensor in the weighing machine one by one. The verification device is a superposition force standard machine in practice. Nevertheless, the pressurizing and the pressurizing stand in the device are loaded manually, which cannot satisfy the demand of loading fluctuation (force value stability) and the maintaining time of the force value stability in the "JJG734-2001, the verification regulations of force standard machine" and "JJG144-2007, the verification regulations of standard force measuring gauge". The verification process is used to verify the loading value of every in-use sensor of the weighing machine, not the span of the weighing machine. The measure accuracy of the weighing machine is not only in relation to the accuracy of every sensor, but also the hardness of the weighing platform, the foundation of the weighing platform, the accuracy of the gauge, and the adapter junction box. Although the in-service sensor of the weighing machine is qualified, the metric property of the weighing machine may not be qualified. Therefore, it is not only fully verifying the metric property of the weighing machine. The factor that affects the accuracy of the weighing machine such as the deflection of the weighing platform surface, the foundation of the weighing platform, the accuracy of the gauge, and the adapter junction box should be considered in the verification process. The prior patent can only be verified at the sensor, so the verification process cannot explain by analogy with the effective weighing status and can only similarly contrast with the in-service sensors of the weighing machine. The most important is that the weighing machine cannot be verified directly.

Figure 1:
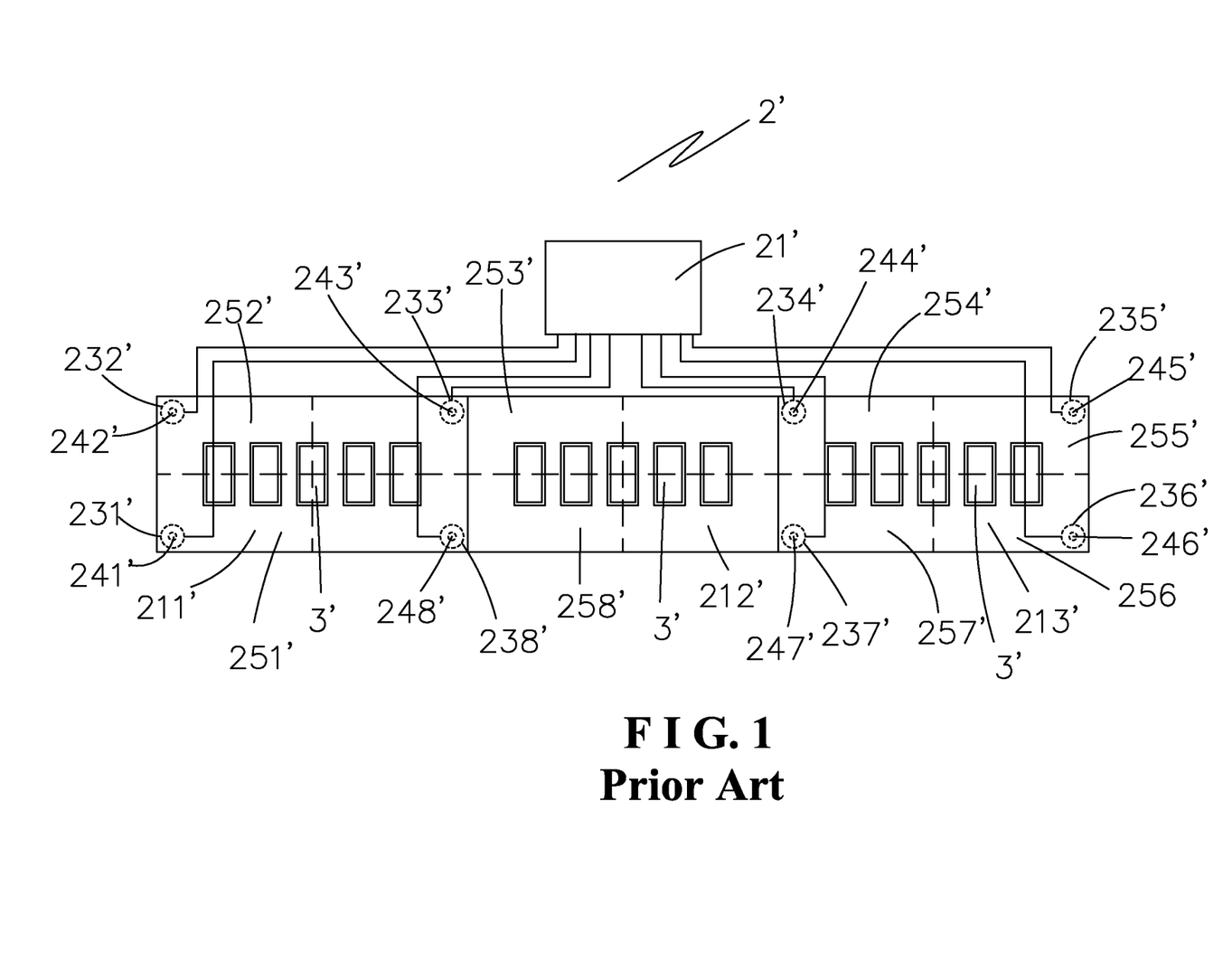
FIG. 1 is a schematic view showing a conventional technique adopting standard counterweights and substitutions for verifying a weighing machine.

The current method of verifying the fixed electronic weighing machine is described as follows: Take a verification of a fixed electronic truck scale weighed 100 tons as an example and apply the standard counterweight and the substitution of the counterweight to verify according to the national standard of the fixed electronic weighing machine stipulated by GB7723-2008 or the verification regulations of the digit indicator weighing machine stipulated in JJG539-1997. Wherein, referring to FIG. 1, a fixed electronic truck scale 2' is in a specification weighed 100 tons with three sections in length of 18 gauges, e=50 kg, m=2000. The truck scale comprises a weighing platform displaying gauge 21', three weighing platform surfaces 211', 212', 213', eight sensors 231'-238', eight supporting points 241'-248' disposed on top of the sensors, and eccentric test areas 251'-258' correspondingly disposed around the respective support points as shown by the dotted line in FIG. 1. While verifying, put the standard counterweight or the substitution 3' of the standard counterweight on each unbalanced loading test area to proceed an eccentricity test sequentially. The specific process of verifying the metric property includes steps as follows:

1. Pre-pressurizing: pre-add the load to 100 t at a time or using a loading vehicle not less than 50 t to go back and forth to a loading implement not less than three times;

2. The accuracy of the zero setting and the tare excluding device;

3. The zero setting before loading;

4. The weighing property:

4.1 A repeatability test of the weighing machine during the verification by adopting the standard counterweight and the substitution to confirm the amount of the standard counterweight: First, check the repeatability of the weighing point at 50 t and add a 50 t standard counterweight on the loading implement for three times. If the error of the repeatability is not larger than 0.3 e, the standard counterweight 3' is able to be reduced to 35% of the maximal weighing measure. If the repeatability is not larger than 0.2 e, the standard 3' is able to be reduced to 20% of the maximal weighing measure;

4.2 The weighing test: Add the counterweights or the substitutions 3' from zero to 100 t in order from small to big and remove the counterweights to zero by the same way. The test should choose five verification points at 1 t, 25 t, 50 t, 75 t, and 100 t;

4.3 The tare-excluding weighing test: At least 2 different tare weights are examined by the tare-excluding weighing test. According to step 4.2, the test points are 1 t, 50 t, the weight of maximal permissible error, the possible maximal net weight, and 80 t;

4.4 The eccentricity test: Put the standard counterweight 3' with a weight of 14 t on the eight eccentric test areas 251'-258' by turns for testing until the errors of the indicated values of the eight eccentric test areas 251'-258' are all not larger than 50 kg;

4.5 The discrimination test: Proceed the test at the weighing points 1 t, 50 t, and 100 t and the verification at the same time; and 4.6 The repeatability test: Proceed to test in two respective groups of the weight at 50 t and the weight closed to the maximal weight (90 t). Each group should be repeatedly tested at least three times.

From the verifications mentioned above, a tonnage of the standard counterweights or the substitutions that need to be transported such as (1)A weight of 100 t is transported in the pre-pressurizing step; (2)A weight of 150 t is transported in the step 4.1 for the repeatability test of the weighing machine during the verification by adopting the standard counterweight and the substitution to confirm the amount of the standard counterweight; (3)A weight of 100 t is transported in the step 4.2 for the weighing test; (4)A weight of 160 t is transported in the step 4.3 for the tare-excluding weighing test; (5)A weight of 112 t is transported in the step 4.4 for eccentricity test; (6)A weight of 270 t is transported in the step 4.6 for the repeatability test.

Therefore, the disadvantages existed in the conventional method of adopting the standard counterweights or the substitutions of the counterweight to verify a fixed electronic weighing machine are described as follows:

1. Heavy workload and the extremely low efficiency. To verify a qualified 100 t fixed electronic truck scale requires counterweights and substitutions in a weight of 932 t. If it is not qualified, the truck scale should be adjusted and then be re-verified, namely moving the counterweights again. The weight of moving the counterweights requires over thousands tons.

2. Poor safety of moving a large number of counterweights or the substitutions. Due to the limited loading surface of the electronic truck scale, such as 54 square gauges of the loading surface for a 100-ton electronic truck scale, it is hard to put 100 tons of counterweights or substitutions on a limit area and is dangerous during loading and unloading the counterweights or the substitutions;

3.Difficulty of finding substitutions. Not every user of large-scale electronic truck scales can find suitable substitutions. For example, stand scale installed at the side of the highway is hard to find a suitable substitution, users for railway, harbor, toxic liquid, gaseous chemical industry, textile factory, and coal mine etc. are also hard to find the suitable substitutions;

4. Difficulty of transporting the standard counterweight. To verify a 100-ton truck scale requires transporting counterweight for at least 50 tons. To verify a 150-ton truck scale requires transporting counterweight for at least 75 tons. In current practice, it can only transport the counterweight at about 15 tons once. The amount of the transportation for once is especially limited in the mountain area with bridge load-limit, road load-limit, topography load-limit, and installation in the ravine (such as mine) etc.

5.Extremely high costs. To transport and move such a large number of standard counterweights and substitutions requires many verification scale vehicles and cranes and spends a few days working with many people to complete the verification. For example, to verify a 100-ton truck scale normally requires 7 workdays.

To sum up, most of the verification organizations in the counties, the cities, and the provinces do not have enough standard counterweights for the large-scale weighing machine (such as the 150-ton electronic truck scale). Even though there are enough standard counterweights, the safety for loading and unloading the counterweights and transporting the counterweights and the transportation costs cannot be ensured under the current technique. Secondly, even if the counterweights are transported to the destination, to proceed the verification according to the verification regulations of the digit indicator weighing machine stipulated by JJG539-1997 requires a heavy verification workload and takes a long time to verify, which is unable to be ensured to follow the verification regulation. Therefore, the conventional method for verifying a large-scale fixed electronic weighing machine by adopting the standard counterweights and the substitutions of the standard counterweights can be improved.

SUMMARY OF THE INVENTION

One of the purposes of the present invention is to provide a system of verifying a large-scale weighing machine, and the other purpose is to provide a self-adjusting loading-unloading load measuring device for verifying a large-scale weighing machine. By adopting the system and the self-adjusting loading-unloading load measuring device, the working efficiency and safety are greatly enhanced, and the costs are saved, which can solve the current problems of the heavy verification workload, the consumption of verification time, the complicated verification process, and the inaccuracy appeared in applying the standard counterweights, or the substitutions of the counterweights, or other non-counterweight verification device during verifying the fixed electronic weighing machine.

The present invention adopts the following techniques to solve the mentioned problems:

One of the adopted techniques is described as follows:

A verification system for a large-scale weighing machine comprises at least four tension frameworks penetrating through a weighing platform hole of a weighing machine preset on a weighing platform surface for connecting to a weighing platform foundation and being disposed perpendicular to the weighing platform surface; at least four self-adjusting loading-unloading load measuring devices disposed corresponding to the tension frameworks, substituting for a standard counterweight or a substitution of the counterweight to load-unload and load measure the weighing platform surface; the self-adjusting loading-unloading load measuring devices being disposed around the tension frameworks; and a constant-load control device connected to a loading-unloading mechanism for allowing the loading-unloading mechanism to maintain constant applied load while loading.

Preferably, the self-adjusting loading-unloading load measuring device includes a self-adjusting loading-unloading mechanism and a high-precision load measuring instrument disposed adjacent to a top side of the loading-unloading mechanism. An accuracy of the high-precision load measuring instrument is at least three times larger than an accuracy of the weighing machine.

Preferably, the high-precision load measuring instrument includes at least three sensors being disposed around and regularly spreading on a center axis of the tension framework, a limiting unit disposed above each sensor, and a sensor measure displaying gauge connecting to each sensor for displaying a load of a force value of the sensor.

Preferably, the loading-unloading mechanism includes a main oil cylinder and a self-adjusting pressure-bearing plate. The main oil cylinder includes an oil cylinder portion defined at an outer side thereof and a piston portion defined at an inner side thereof. The piston portion is disposed adjacent to a bottom side of the sensor. The loading-unloading mechanism further includes a self-adjusting pressure-bearing plate disposed on the weighing platform surface of the weighing machine and sleeved on the tension framework. The self-adjusting pressure-bearing plate is disposed under the main oil cylinder.

Preferably, the self-adjusting pressure-bearing plate includes a pressure-bearing plate body disposed separate from the oil cylinder portion by a distance and at least three universal ball bearings used for automatically adjusting a pressure-bearing direction so that a bearing axis of the sensor and a bearing axis of the tension pole body are parallel to each other. The universal ball bearing is disposed around and regularly spreads on a center axis of the tension framework, embeds into a top surface of the pressure-bearing plate body, and a top side of the universal ball bearing is exposed to contact the oil cylinder portion of the main oil cylinder.

Preferably, a screw used for adjusting the main oil cylinder is further disposed at the outer side of the main oil cylinder. A top side of the screw supports a top side of the pressure-bearing plate body.

Preferably, the tension framework includes a ground tension pole or a tension ring embedding in deep of the weighing platform foundation and a tension pole body connecting to the ground tension pole or the tension ring.

Preferably, the limiting unit is defined as a nut for screwing and sleeved at a top side of the tension pole body.

Preferably, the tension framework further includes a pressure-bearing pad adjacent to a bottom side of the nut to be sleeved on the tension pole body and a thrust joint bearing adjacent to a bottom side of the pressure-bearing pad to be sleeved on the tension pole body to adjust a coaxiality of the tension pole body and the sensor.

Preferably, the sensor includes a top base, a bottom base, and a flexible unit disposed between the top base and the bottom base. The top base is disposed adjacent to a bottom side of the thrust joint bearing.

Preferably, the tension framework includes a self-adjusting coaxiality mechanism for maintaining the coaxiality of the tension pole body and allowing the tension pole body to be perpendicular to the weighing platform surface. The self-adjusting coaxiality mechanism is disposed between the tension pole body and the ground tension pole or the tension ring. The self-adjusting coaxiality mechanism includes a pole-end thrust bearing.

Preferably, the tension framework includes a height-adjusting tension pole disposed at a part of a bottom side on the tension pole body that is under the weighing platform.

Preferably, a constant-load control device includes an oil resources mechanism, a constant-load control mechanism, and a computer provided with constant-load control software.

Preferably, the oil resources mechanism includes a first servo electric machine, a second servo electric machine, a first servo oil pump, and a second servo oil pump. An input end of the first servo electric machine and an input end of the second servo electric machine are connected with the computer. An output end of the first servo electric machine is connected with an input end of the first servo oil pump. An output end of the second servo electric machine is connected with an input end of the second servo oil pump. The constant-load control mechanism includes a spill valve, an inverting valve, and an electronic stop valve. An input end of the inverting valve is respectively connected with output ends of the first servo oil pump and the second servo oil pump. The inverting valve is further connected to the spill valve. An output end of the inverting valve is connected to the main oil cylinder. At least three sensors are connected to the sensor measure displaying gauge. The sensor measure displaying gauge is further connected to the computer; each sensor of the weighing machine is connected to the displaying gauge of the weighing machine. The displaying gauge of the weighing machine is further connected to the computer.

The other one of the adopted techniques is described as follows:

A self-adjusting loading-unloading load measuring device for verifying large-scale weighing machine; wherein, a self-adjusting loading-unloading load measuring device includes a self-adjusting loading-unloading mechanism substituting for a standard counterweight or a substitution of the counterweight to load-unload the weighing platform surface and a high-precision load measuring instrument disposed adjacent to a top side of the loading-unloading mechanism. An accuracy of the high-precision load measuring instrument is at least three times larger than an accuracy of the weighing machine.

Preferably, the self-adjusting loading-unloading load measuring device penetrates through a weighing platform hole of a weighing machine preset on a weighing platform surface for connecting to a weighing platform foundation and being disposed perpendicular and around to the tension framework of the weighing platform surface.

Preferably, the high-precision load measuring instrument includes at least three sensors being disposed around and regularly spreading on a center axis of the tension framework, a limiting unit disposed above the sensor, and a sensor measure displaying gauge connecting to each standard sensor and displaying a load of a force value of the sensor.

Preferably, the loading-unloading mechanism includes a main oil cylinder and a self-adjusting pressure-bearing plate; the main oil cylinder includes an oil cylinder portion defined at an outer side thereof and a piston portion defined at an inner side thereof; the piston portion is disposed adjacent to a bottom side of the sensor; the loading-unloading mechanism further includes a self-adjusting pressure-bearing plate disposed on the weighing platform surface of the weighing machine and sleeved on the tension framework; the self-adjusting pressure-bearing plate is disposed under the main oil cylinder.

Preferably, the self-adjusting pressure-bearing plate includes a pressure-bearing plate body disposed separate from said oil cylinder portion by a distance and at least three universal ball bearings used for automatically adjusting a pressure-bearing direction so that a bearing axis of said sensor and a bearing axis of said tension pole body are parallel to each other; said universal ball bearing is disposed around and regularly spreads on a center axis of said tension framework, embeds into a top surface of said pressure-bearing plate body, and a top side of said universal ball bearing is exposed to contact said oil cylinder portion of said main oil cylinder.

The present invention discloses a verification system for large-scale weighing machine adopted by the second standard instrument stipulated in the international standards to verify the large-scale weighing machine. The second standard instrument is an independent auxiliary device, namely the non-counterweight verification device, which includes the advantages as follows:

1. It is not a sensor used for verifying the weighing machine but directly proceeding the requested verifications to the weighing machine. Therefore, the deflection of the weighing platform surface does not have to be examined. During the verification process, nearby the supporting point of the sensor can be directly verified without limiting therein, thereby simulating the actual weighing status of the weighing machine.

2. Safety and convenience of verification and transportation. The whole set of the non-counterweight verification device is not heavier than 1.5 t with a small size and a light weight. Therefore, it is safe and convenient for verification and transportation.

3. Less verification workload. The constant-load control device is adopted to load-unload automatically and can self-controlling by software. Hundreds or thousands of counterweights or substitutions do not have to be moved. Therefore, the verification workload is less.

4. High verification efficiency. The standard counterweights required in verification do not have to be transported, and the substitutions do not have to be found. Therefore, it costs only half of a workday to verify a 100 t or 200 t truck scale, which renders the working efficiency extremely high.

5. Low verification costs. While operating the device, it requires only a small truck to transport the standard instrument for one time and half of workday to complete the verification.

6. Excellent society efficiency. To compare the conventional verification method adopting the standard counterweights as a standard instrument verification weighing machine, the present invention can save 5000 RMB dollars of transportation fee and 3000 RMB dollars of labor fee for verifying a large-scale electronic truck scale according to the computation. For example, there are over 4000 large-scale electronic truck scales in Fu-Jien province. If truck scales are verified twice a year, the costs of the enterprises in Fu-Jien can save over 60 million RMB dollars per year.

BRIEF DESCRIPTION OF THE DRAWINGS

FIG. 5b is a cross-sectional view showing the A-A section in FIG. 5a;

FIG. 7b is a vertical view showing the self-adjusting pressure-bearing plate in FIG. 7a;

DETAILED DESCRIPTION OF THE PREFERRED EMBODIMENTS

Referring to the FIGS. 2, 3, 4, and 8, a verification system for large-scale weighing machine of the present invention is shown. The verification system 1 is a verification system for non-counterweight and independent auxiliary weighing machine which is applied to calculate a large-scale fixed electronic weighing machine 2 that is shown in FIG. 9a. The verification system comprises at least four tension frameworks 11, at least four self-adjusting loading-unloading load measuring devices 12, and a constant-load control device 13. The amount of the tension frameworks 11 is as same as the amount of the self-adjusting loading-unloading load measuring device 12, which are respectively corresponded to each other. Each tension framework 11 penetrates through a weighing platform hole 211 of a weighing machine that is preset on a weighing platform surface 21 of a weighing machine 2 for connecting to a weighing platform foundation 3, and is disposed perpendicular to the weighing platform surface 21. Each self-adjusting loading-unloading load measuring device 12 is disposed along the surroundings of each tension framework 11 for substituting a counterweight or a substitution of the counterweight to load-unload and load measure the weighing platform surface 21. Each self-adjusting loading-unloading load measuring device 12 includes a self-adjusting loading-unloading mechanism 121 and a high-precision load measuring instrument 122. The high-precision load measuring instrument 122 is disposed adjacent to the loading-unloading mechanism 121 to ensure the verification accuracy and traceability. An accuracy of the high-precision load measuring instrument 122 is at least three times larger than an accuracy of the weighing machine. The constant-load control device 13 is connected to the loading-unloading mechanism 121 and allows the loading-unloading mechanism 121 to maintain constant applied load while loading.

Figure 3:
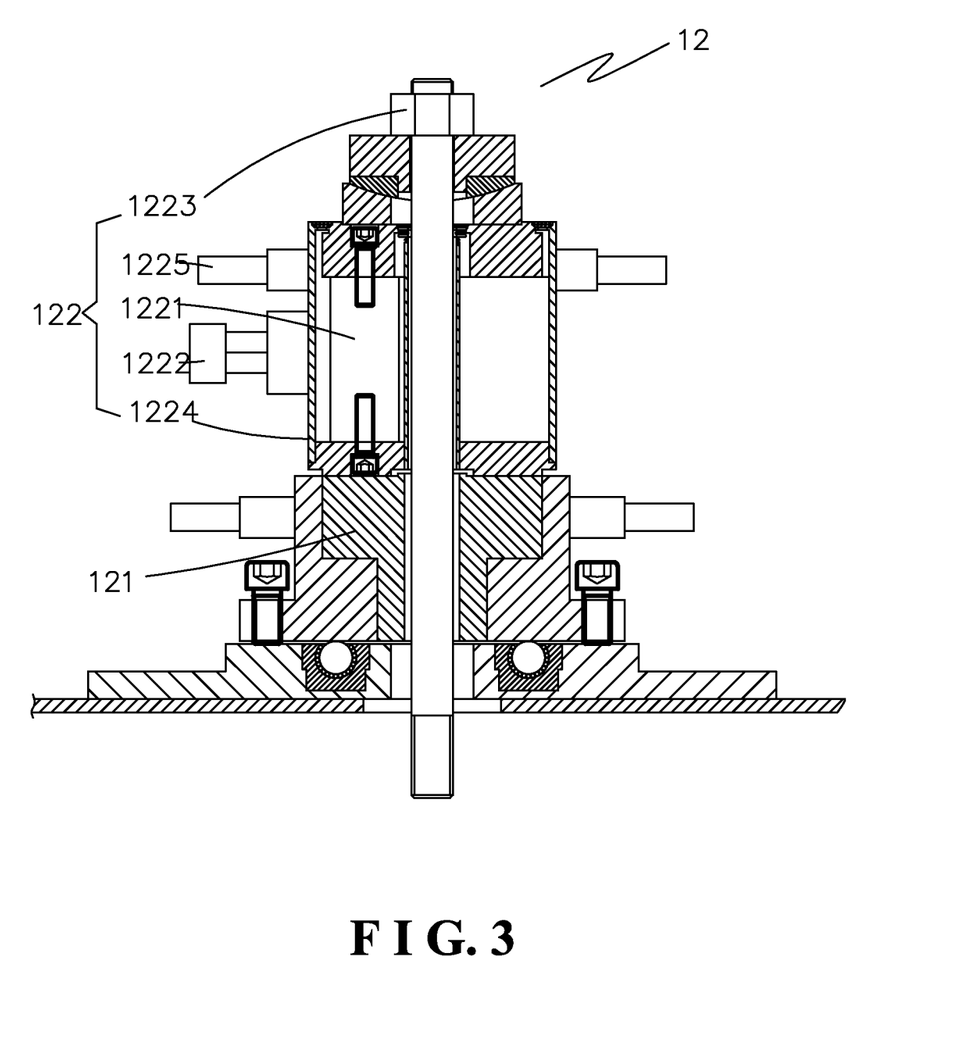
FIG. 3 is a cross-sectional view showing a self-adjusting loading-unloading load measure device of the present invention.
Figure 8:
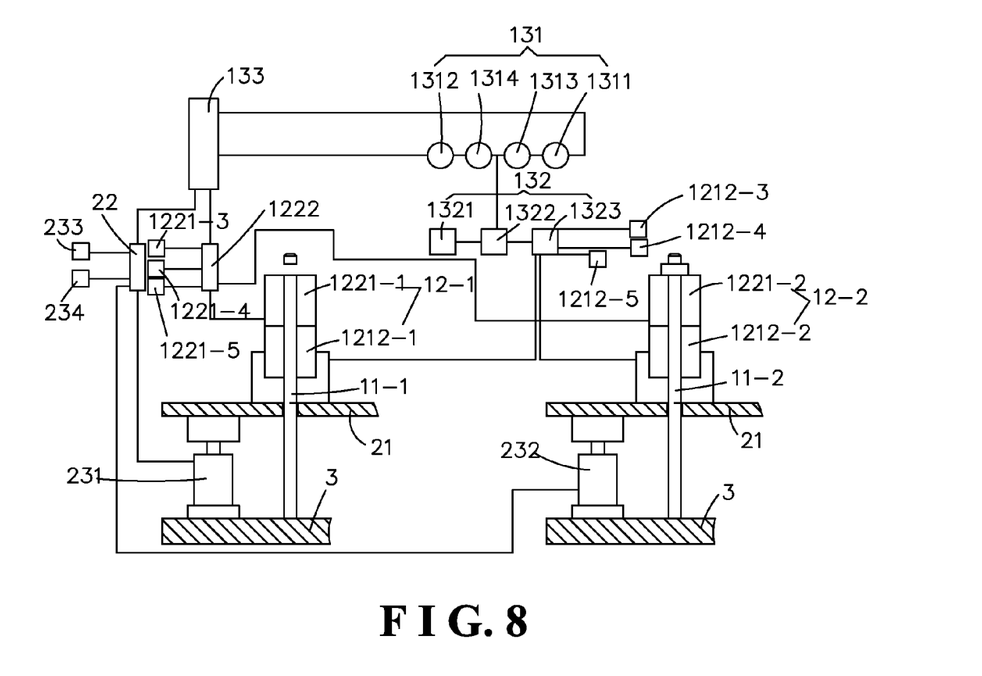
FIG. 8 is a schematic view showing the connection of the inner side and the outer side of the verification system.
Figure 9A:
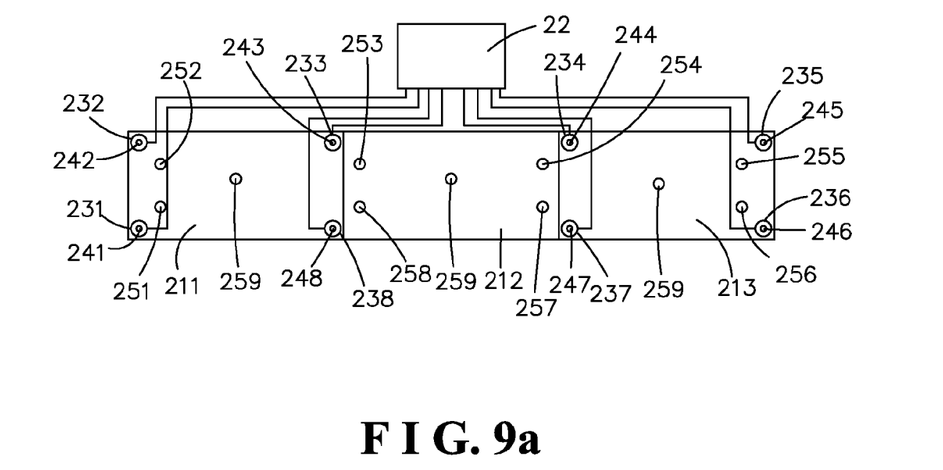
FIG. 9a is a schematic view showing a verification system for a weighing machine adopting the present invention.

Referring to FIG. 3, the high-precision load measuring instrument 122 includes at least one sensor 1221, a measure displaying gauge 1222 of sensor (as shown in FIG. 8), and a limiting unit 1223. The limiting unit 1223 is disposed on top of the sensor 1221 and is detachable for limiting and adjusting the position of the sensor 1221. In this embodiment the limiting unit 1223 is defined as a nut screwed on the tension framework 11. The nut is applied for screwing and spacing. The measure displaying gauge 1222 of sensor is connected to the sensor 1221 and is applied to display a load of force value of the sensor 1221.

Figure 4:
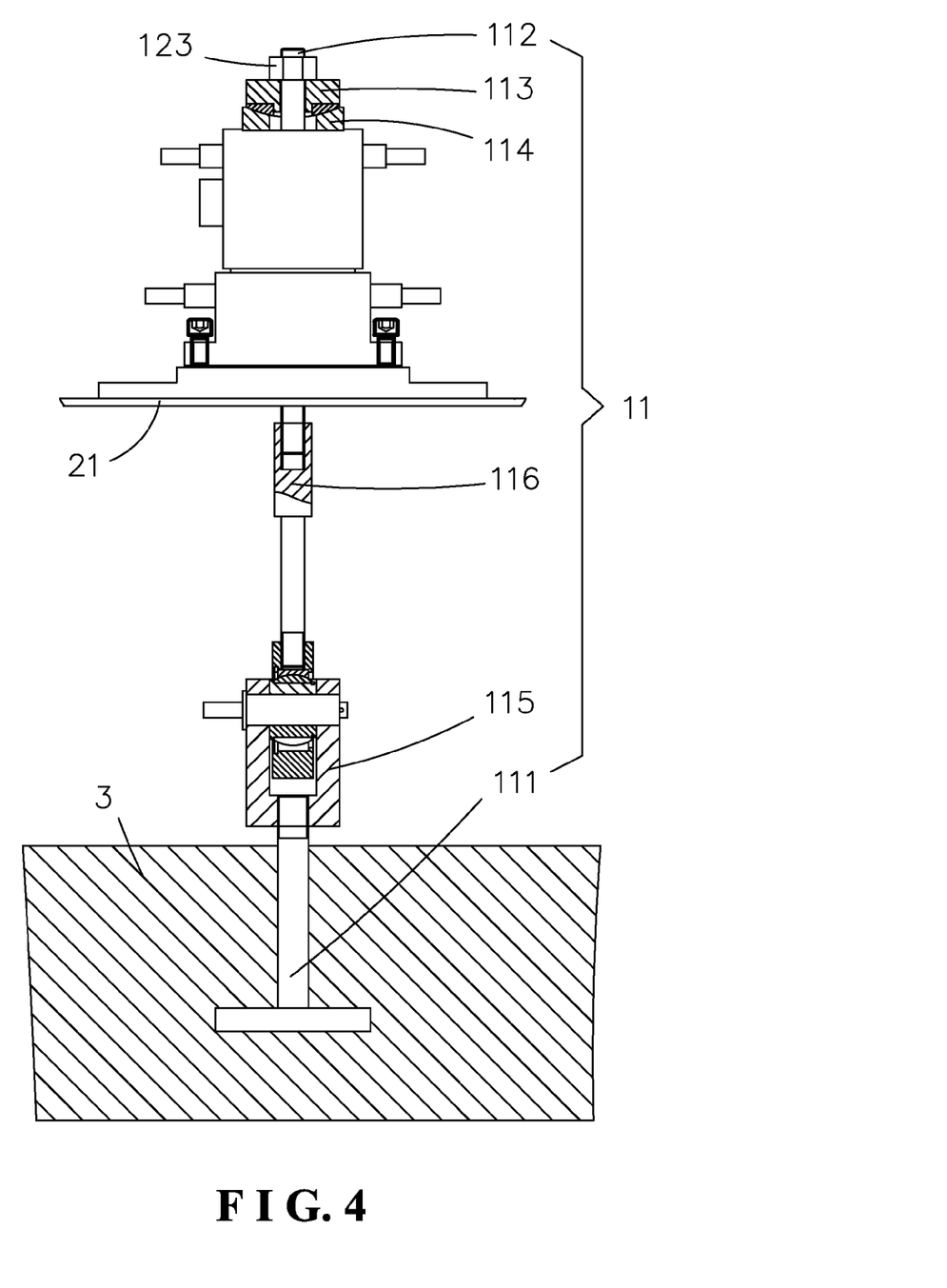
FIG. 4 is a cross-sectional view showing a verification system of the present invention.

Referring to FIG. 4, the tension framework 11 includes a ground tension pole 111, a tension pole body 112, a pressure-bearing pad 113, a thrust joint bearing 114, a self-adjusting coaxiality mechanism 115, and a height-adjusting tension pole 116. The ground tension pole 111 is shown in FIG. 4. The ground tension pole 111 is embedded in deep of the weighing platform foundation and is fixedly connected to the tension pole body 112. The pressure-bearing pad 113 is disposed adjacent to a bottom side of the limiting unit 1223, namely the nut to be sleeved on the tension pole body 112. The thrust joint bearing 114 is disposed adjacent to a bottom side of the pressure-bearing pad 113 to be sleeved on the tension pole body 112. The self-adjusting coaxiality mechanism 115 is disposed between the tension pole body 112 and the ground tension pole 111 and is applied to automatically adjust a coaxiality of the tension pole body 112 and the sensor 1221 (as shown in FIG. 3) so that the tension pole body 112 is coaxial and perpendicular to the weighing platform surface 21. The self-adjusting coaxiality mechanism 115 achieves an adjustment of coaxiality via a support of a pole-end thrust bearing. The height-adjusting tension pole 116 is disposed at a bottom side of the tension pole body 112, concretely a part of the bottom side on the tension pole body 112 that is under the weighing platform 21. The height-adjusting tension pole 116 can be easily adjusted to a needed height of the tension framework 11 according to the heights of the weighing platform surface 21 and the weighing platform foundation 3 of the verification ground.

Figure 5A:
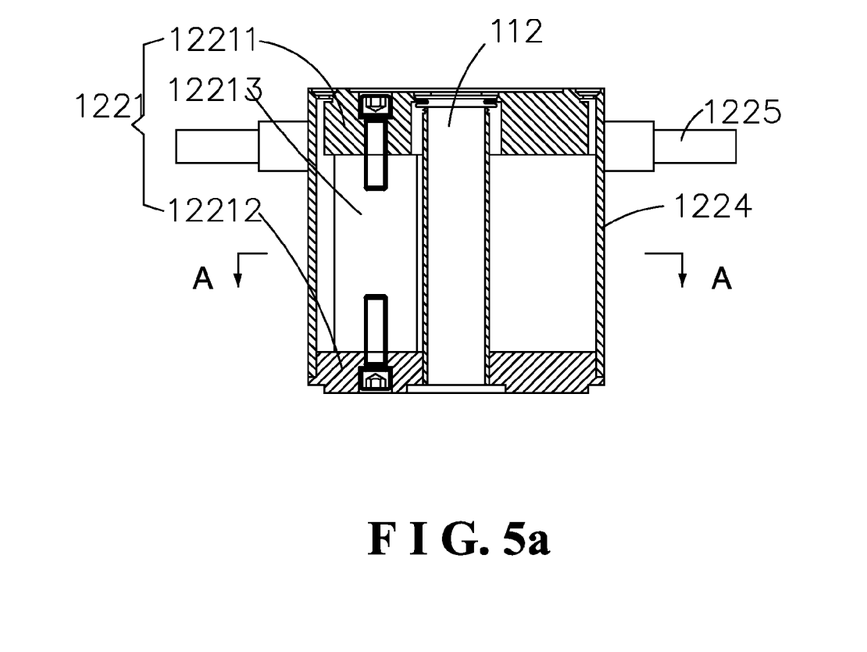
FIG. 5a is a cross-sectional view showing a sensor of the present invention.
Figure 5B:
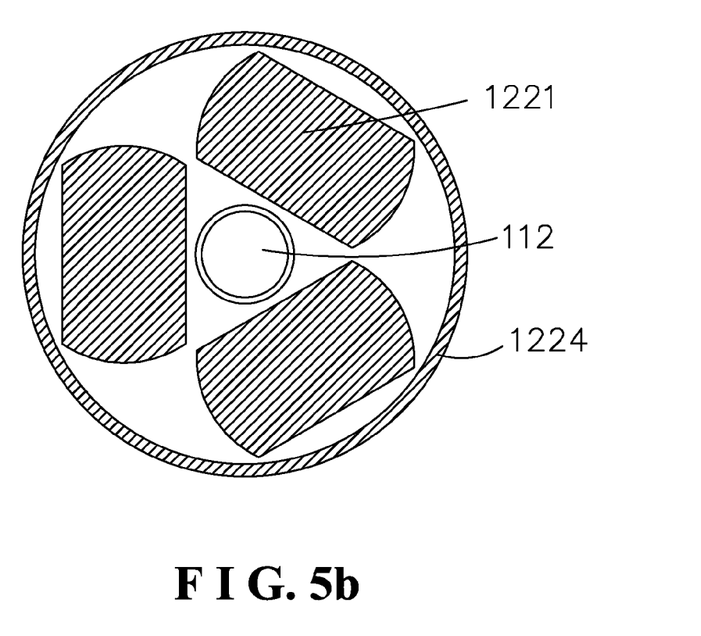

Referring to FIGS. 5a and 5b, the high-precision load measuring instrument 122 includes at least three sensors 1221. Each sensor 1221 is disposed around and regularly spreads on a center axis of the tension framework 11. The measure displaying gauge 1222 of sensor (as shown in FIG. 3) is connected to each sensor 1221 and is applied to display the resultant load of force value of each sensor 1221. The sensor 1221 includes a top base 12211, a bottom base 12212, and a flexible unit 12213 disposed between the top base and the bottom base. The top base 12211 is disposed adjacent to a bottom side of the thrust joint bearing (as shown in FIG. 4). The high-precision load measuring instrument 122 further includes a housing 1224 wrapping the sensor 1221 therein, and an easy-operating handle 1225 disposed on the housing 1224.

Figure 6:
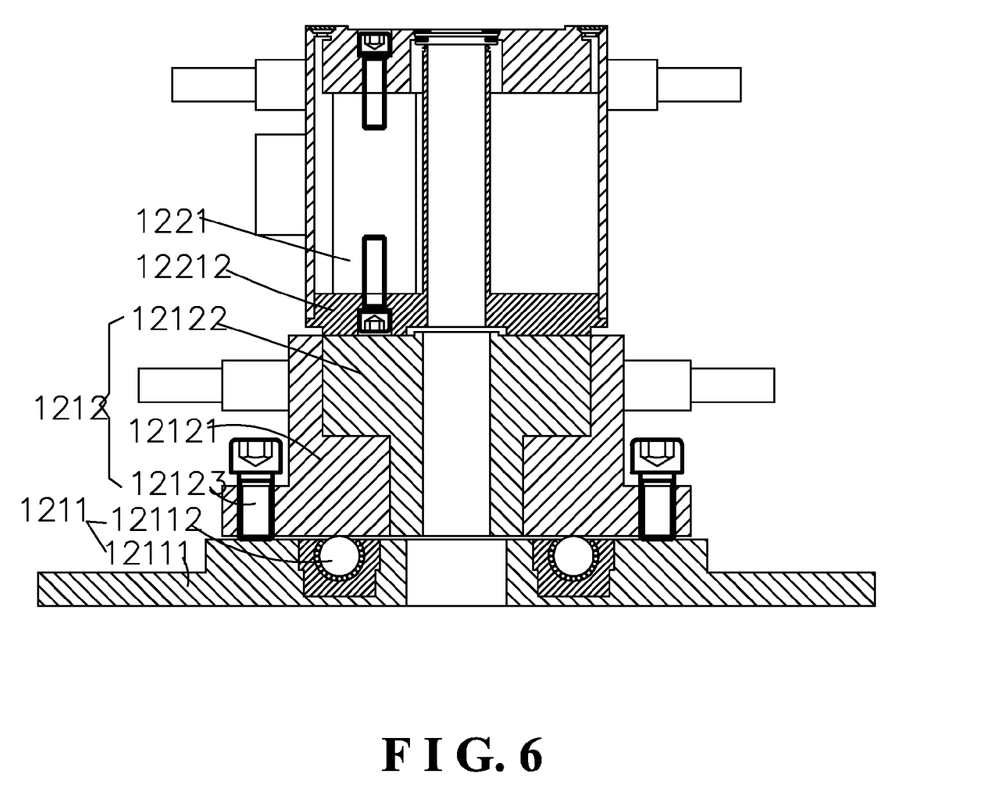
FIG. 6 is a cross-sectional view showing the location of a loading-unloading mechanism and a high-precision load measuring instrument.

Referring to FIG. 6, the loading-unloading mechanism 121 includes a self-adjusting pressure-bearing plate 1211 and a main oil cylinder 1212. The oil cylinder 1212 includes an oil cylinder portion 12121 defined at an outer side thereof and a piston portion 12122 defined at an inner side thereof. The piston portion 12122 is disposed adjacent to the bottom base 12212 of the sensor 1221. When the piston portion 12122 operates upward, the sensor 1221 is pressurized. The loading-unloading mechanism 121 further includes a self-adjusting pressure-bearing plate 1211 disposed on the weighing platform surface 21 (as shown in FIG. 9a) of the weighing machine 2 (as shown in FIG. 9a) and sleeved on the tension framework 11. The self-adjusting pressure-bearing plate 1211 is disposed under the main oil cylinder 1212. When the oil cylinder portion 12121 operates downward, the self-adjusting pressure-bearing plate 1211 is pressurized so as to render the weighing platform surface 21 pressurized. Due to the self-adjusting pressure-bearing plate 1211 includes a certain cover area, part of the area near the weighing platform hole 211 can be covered, thereby simulating the actual weighing status of the weighing machine and attaining a more scientific metric verification.

Figure 7A:
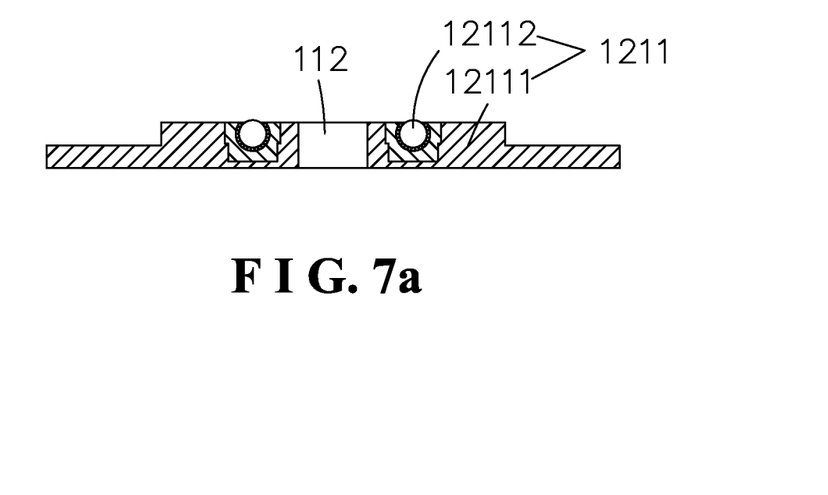
FIG. 7a is a cross-sectional view showing a self-adjusting pressure-bearing plate of the present invention.
Figure 7B:
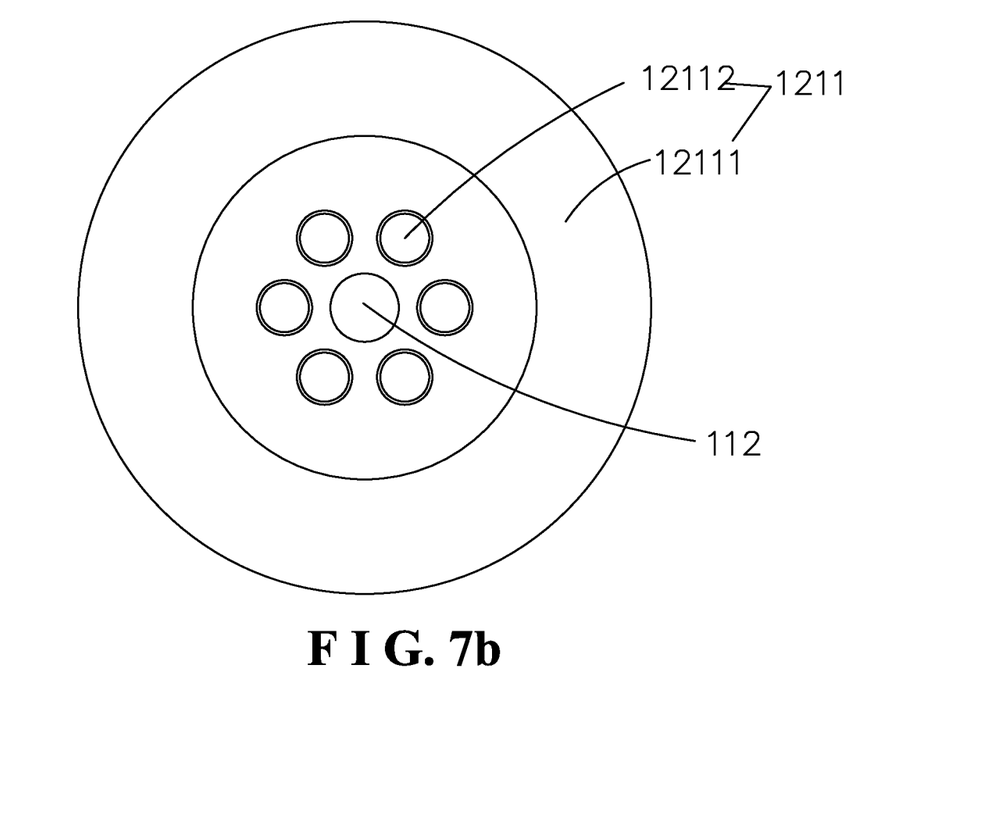

Referring to FIGS. 6, 7a, and 7b, the self-adjusting pressure-bearing plate 1211 includes a pressure-bearing plate body and at least three universal ball bearings 12112. The pressure-bearing plate body is disposed separate from the oil cylinder portion 12121 by a distance. In this embodiment, there are six universal ball bearings 12112. The universal ball bearings 12112 are disposed around and regularly spread on a center axis of the tension pole body 112, embed into a top surface of the pressure-bearing plate body 12111, and a top side of the universal ball bearing is exposed to contact the oil cylinder portion 12121 of the main oil cylinder 1211. Except for the part which each universal ball bearing 12112 contacts with the oil cylinder portion 12121, other parts have certain interspaces. The universal ball bearing 12112 is applied to adjust the pressure-bearing direction automatically so that a bearing axis of the sensor 1221 is parallel to a bearing axis of the tension pole body 112. A screw 12123 used for level-adjusting is further disposed at the outer side of the main oil cylinder 1211. A top side of the screw 12123 support to a top surface of the pressure-bearing plate body 12111 for positioning and rendering the main oil cylinder 1212 integrally in a level status. Therefore, the main oil cylinder 1212 is ensured to be used after positioning.

Figure 2:
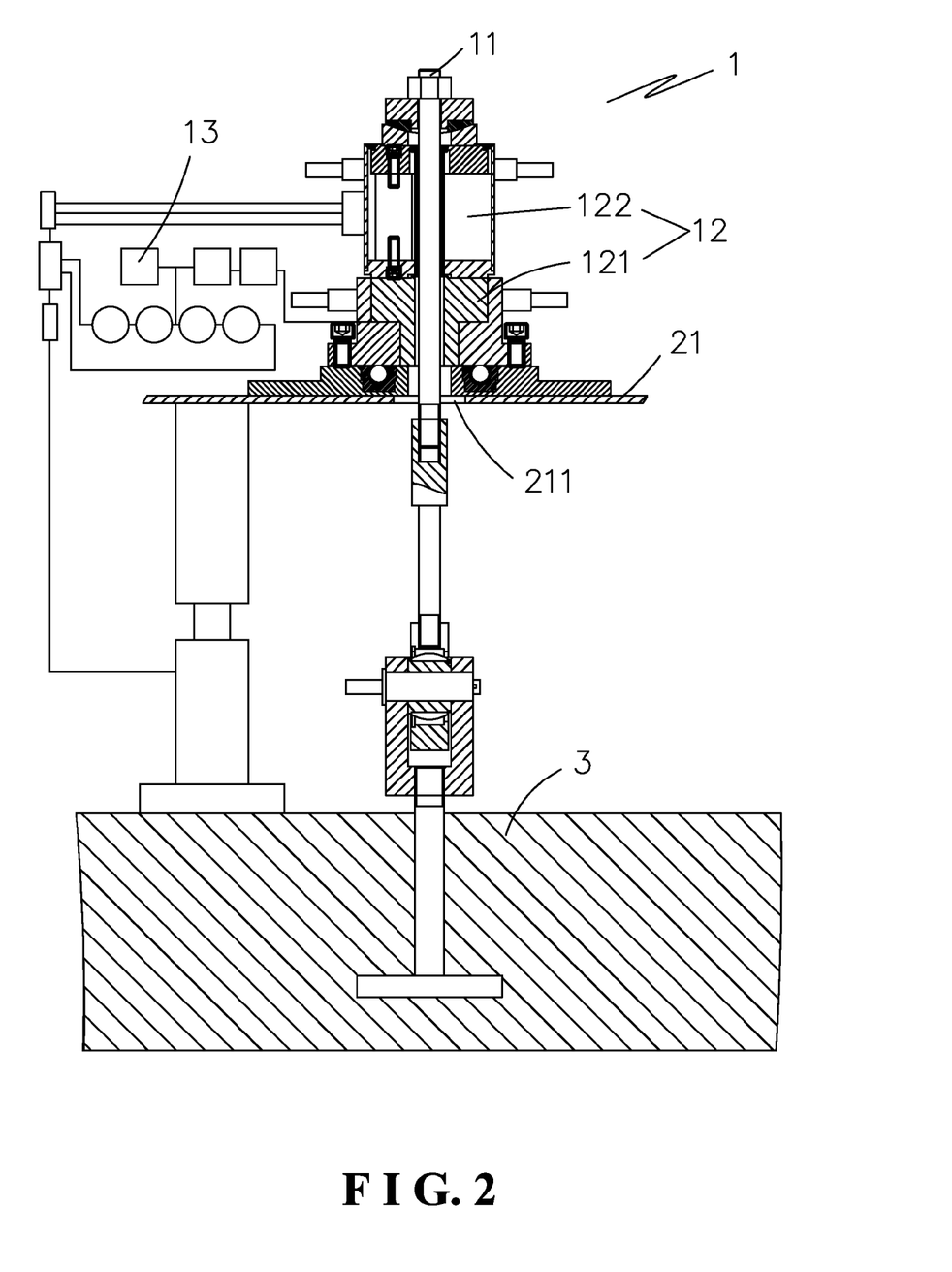
FIG. 2 is a cross-sectional view showing a verification system of the present invention.

Referring to FIGS. 2 and 8, the constant-load control device 13 includes an oil resources mechanism 131, a constant-load control mechanism 132, and a computer 133 provided with constant-load controlling software. The oil resources mechanism 131 includes a first servo electric machine 1311, a second servo electric machine 1312, a first servo oil pump 1313, and a second servo oil pump 1314. The output ends of the first servo electric machine 1311 and the second servo electric machine 1312 are both connected to the computer 133. The output end of the first servo electric machine is connected to the input end of the first servo oil pump 1313. The output end of the second servo electric machine 1312 is connected to the input end of the second servo oil pump 1314. The constant-load control mechanism 132 includes a spill valve 1321, an inverting valve 1322, and an electric stop valve 1323. The spill valve 1321 is applied to adjust the data traffic or protect the overload. The inverting valve 1322 is applied to control the feeding and returning of the main oil cylinder 1211. The electric stop valve 1323 is applied to control the operation of the main oil cylinder 1211. The input end of the inverting vale is respectively connected to the output ends of the first servo oil pump 1313 and the second servo oil pump 1314. The inverting valve is connected to the spill valve 1321. The output end of the inverting valve is first connected to the electric stop valve 1323, and then the combination is connected to the main oil cylinder 1211. Further, the output end of the inverting valve is connected to the main oil cylinder 1211. At least three sensors 1211 are connected to the sensor measure displaying gauge 1222. The sensor measure displaying gauge 1222 is then connected to the computer 133. Each sensor 231-234 of the weighing machine is connected to the weighing platform displaying gauge 22. The weighing platform displaying gauge 22 is then connected to the computer 133.

Referring to FIGS. 2-4, 5a-5b, 6, 7a-7b, and 8, the principles of each element in the verification system for large-scale weighing machine of the present invention is described as follows:

Tension framework 11: The tension framework 11 is automatically adjusts the coaxiality of the 1221 via the self-adjusting coaxiality mechanism 115 disposed on the tension pole body 112, so the center axes of the tension pole body and the sensor are parallel to each other and are adjusted until being perpendicular to the weighing platform surface 21 of the weighing machine 2. The tension framework 11 adjusts the pressurizing perpendicularity and the axis perpendicularity of the sensor 1221 via the thrust joint bearing 114 disposed on the tension pole body 112 so as to ensure the pressurizing axis of the sensor 1221 to be as same as the axis of the sensor 1221 itself. The tension framework 11 includes a height-adjusting tension pole 116 able to easily adjust the needed height of the tension framework 11 according to the height of the weighing platform surface 21 and the weighing platform foundation 3 of the verification ground. The tension strength of the framework could be reached to 300 kN.

Self-adjusting loading-unloading load measuring device 12: When verifying the large-scale weighing machine, the pressurizing coaxiality of the sensor 1221 of the high-precision load measuring instrument 122 disposed on the weighing platform surface 21 cannot be ensured. Therefore, the self-adjusting pressure-bearing plate 1211 is designed to automatically adjust the pressurizing direction of the sensor 1221 to be parallel to the pressurizing direction of the tension pole body 112 and a sensor 1221 allowing an eccentric load is also designed to meet the verification demand. The sensor 1221 allowing the eccentric load comprises three sensors 1221 capable of collecting the force value evenly disposed between the top base 12211 and the bottom base 12212. The three sensors 1221 have the same output sensitivity so as to ensure the sensors 1221 outputting an electric signal in a positive proportion to the weight value and keeping the resultant load to be constant when bearing the eccentric load. When the sensor 1221 is pressurized, the flexible unit 12213 of the sensor 1221 is deformed, which renders a foil gauge bridge-circuit adhered to the flexible unit 12213 lose the balance and output an electric signal in an positive proportion with the weight value. The signal is magnified by a linear magnifier, transferred into a digital signal via A/D, and then processed by a microprocessor of standard sensor measure displaying gauge. The self-adjusting pressure-bearing plate 1211 is composed of the pressure-bearing plate body 12111 and the universal ball bearing 12112. When the bearing axial direction of the sensor 1221 of the high-precision load measuring instrument 122 is not parallel to the bearing axial direction of the tension pole body 112, the universal ball bearing 12212 affects the loading-unloading mechanism 121 and the high-precision load measuring instrument 122 in a condition of $Fx{>}lkgf$. Therefore, the loading-unloading mechanism 121 and the sensor 1221 automatically adjust their position so that the bearing axial direction of the sensor 1221 is parallel to the bearing axial direction of the tension pole. The piston portion 12122 is disposed adjacent to the bottom base of the sensor 1221. The piston portion 12122 is restrictedly positioned by the limiting unit 123 when operating upward, whereby the sensor 1221 is pressurized. The self-adjusting pressure-bearing plate 1211 is disposed under the main oil cylinder 1212. The reacting force between the piston portion 12122 and the oil cylinder portion 12121 renders the oil portion operate downward. Simultaneously, the self-adjusting pressure-bearing plate 1211 is pressurized and renders the weighing platform surface 21 pressurized. In one word, after the verification is started, the loading-unloading mechanism 121 loads the high-precision load measuring instrument 122 and the self-adjusting pressure-bearing plate 1211, so that the high-precision load measuring instrument 122 and the self-adjusting pressure-bearing plate 1211 bear the load with a same force value at the same time. Due to the self-adjusting pressure-bearing plate 1211 is put on the weighing machine 2 such as the weighing platform surface 21 of a truck scale, the weighing platform surface 21 of a truck scale receives a downward load of force value as same as the weight value of the freight and the weight value is displayed via the weighing platform displaying gauge of the truck scale. The high-precision load measuring instrument 122 applies a force standard machine (not shown) to demarcate a fixed point and the indicating value thereof is true value. An error value of the weighing machine 2 is the difference by comparing the displaying value of the high-precision load measuring instrument 122 and the displaying value of the weighing platform displaying gauge 22 of the truck scale. The self-adjusting loading-unloading load measuring device 12 as shown in FIG. 2, a quality measuring accuracy thereof is greater than 0.01%, an repeatability thereof is greater than 0.01%, and an self-positioning accuracy is greater than $\phi 0.3$.

Constant-load control device 13: The constant-load control device 13 is able to attain the indexes such as a sensitive restriction at 0.01%, a loading fluctuation (a force stability) at 0.005%/30 min, a loading-unloading time of each grade <30 s, and a maintain time of force value stability greater than one hour.

Referring to FIG. 8, a truck scale 2 comprised with four sensors 231-234 is taken as an example to describe the connection of installing the verification system of the present invention. The weighing machine comprises a weighing platform surface 21, a weighing platform displaying gauge 22, and a plurality of sensors 231-234 connected to the weighing platform displaying gauge 22. When installing, the weighing platform holes 251-254 are installed around the weighing machine, and the weighing platform hole 255 is stalled in the center of the weighing platform surface 21. The tension framework 11-1 and the self-adjusting loading-unloading load measuring device 12-1 are installed at the position of the weighing platform surface 251. The self-adjusting loading-unloading load measuring device 12-1 includes a sensor 1221-1 and a main oil cylinder 1212-1.

The tension framework 11-2 and the self-adjusting loading-unloading load measuring device 12-2 are installed on the weighing platform hole 252, and the self-adjusting loading-unloading load measuring devices installed on other weighing platform holes are not shown completely in FIG. 9. The self-adjusting loading-unloading load measuring device 12-2 includes a sensor 1221-2 and a main oil cylinder 1212-2. The sensors 1221-1, 1221-2 are both connected to the sensor measure displaying gauge 1222. The sensors 1221-3, 1221-4, 1221-5 are all connected to the sensor measure displaying gauge 1222. The main oil cylinders 1212-1, 1212-2 are both connected to the electric stop valve 1323 of the constant-load control device 13. The main cylinders 1212-3, 1212-4, 1212-5 of the self-adjusting loading-unloading load measuring device installed on other weighing platform holes are all connected to the electric stop valve 1323. The self-adjusting loading-unloading load measuring devices share the sensor measure displaying gauge 1222 and can display the standard value of each weighing point at the same time.

The controlling principle of the verification system is described as follows:

Referring to FIG. 8, according to the demand of verifying the truck scale, the computer 133 controls the electric stop valve 1323 to dominate single or multiple self-adjusting loading-unloading load measuring devices at the same time, thereby attaining a single point or multiple point auto-verification of the truck scale. A controlling process for the self-adjusting loading-unloading load measuring device 12-1 is taken as an example. The test is started after setting the control a quality and quantity value. The electric stop valve 1323 is opened to be connected to an oil passage of the main cylinder 1212-1, and other oil passages are stopped. The computer 133 collects an actual signal of the sensor 1221-1 via the sensor measure displaying gauge 1222. Because the three evenly-disposed sensors are adopted, the actual signal at this place is a resultant of three sensors 1221, namely the resultant is the actual target quality value. After computing, the computer sends instructions of the speed and the torque to the second servo electric machine 1312. The first servo electric machine 1311 controls the rotating speed and the torque of the first servo oil pump 1313 and feeds oil to the main oil cylinder 1212-1 via the inverting valve 1322. The second servo electric machine 1312 controls the rotating speed and the torque of the second servo oil pump 1314 and returns oil to the main oil cylinder 1212-1 via the inverting valve 1322. The difference of the rotating speed between the first servo oil pump 1313 and the second servo oil pump 1314 determines the advancement and the retreat, the pressure, and the speed of the main oil cylinder 1212-1. The main oil cylinder 1212-1 instantly sends the signal to the computer 133 via the measure displaying gauge 1222 of sensor and the sensor 1221-1. The computer 133 instantly sends the instructions of the speed and the torque to the first servo electric machine 1311 and the second servo electric machine 1312 via computing, so that a closed-loop control is formed. Until the resultant value of the sensor 1221-1 reaches the predetermined quality value, the difference between the displaying value of the truck scale displayer, namely the weighing platform displaying gauge 2210, and the displaying value of the measure displaying gauge 1222 of sensor. During the actual verification process, the tension framework 11 and self-adjusting loading-unloading load measure device 12 are installed nearby the support point of each weighing machine. By using the constant-load control device 13, the software installed in the computer 133 conforms to the national standard "GB7723-2008 the fixed electronic weighing machine" and the regulation "JJG539-1997 the verification regulations of digit weighing machine" and proceeds the respective tests and detections of the metric property, such as a pre-pressurizing and weighing test, a discrimination test, a tare excluding weighing test, an eccentricity test, and a repeatability test to the weighing machine 2. While proceeding each test and detection, the difference between the sum of the weighing value of the self-adjusting loading-unloading load measuring device 12 and the displayed value of the weighing platform displaying gauge 22 is the verification error value of the weighing machine 2. The verification system 1 of the present invention allows the verification state of the truck scale to correspond with the weighing state of the vehicle to ensure the validity and the reliability of the verification result of the electronic truck scale. In this embodiment, the verification of the truck scale is herein described, but the verification system 1 of the present invention is not restricted within the verification of the truck scale, but within the verification of the large-scale fixed electronic weighing machine applied in different uses and mechanisms.

Figure 9B:
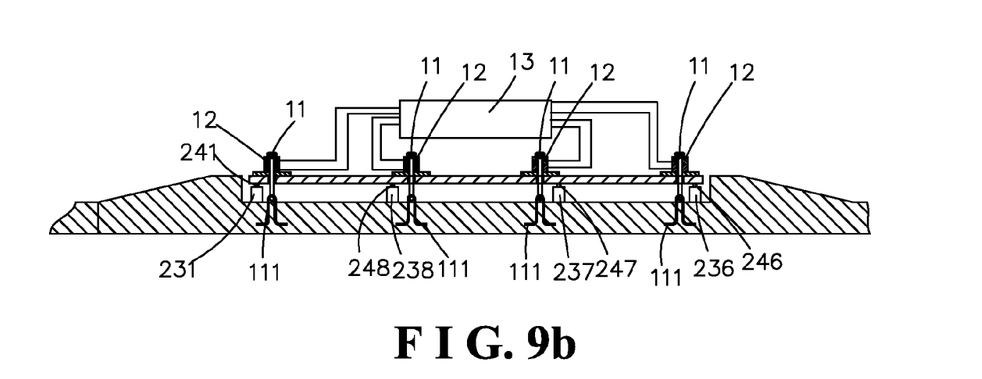
FIG. 9b is a schematic view showing the verification system for the weighing machine adopting the present invention.

The method to verify and install the verification system for large-scale weighing machine is described as follows:

Referring to FIGS. 9*a* and 9*b*, different from the conventional technique shown in FIG. 1, the method of the present invention substitutes the second standard instrument in the international standard for the standard weight or the standard weight and the substitution in order to verify the scale 2 with the verification system for large-scale fixed electronic weighing machine. A fixed electronic weighing machine 2 is shown in FIG. 9*a* and comprises a weighing platform surface 21 and a weighing platform displaying gauge 22. A specification of 100 t fixed electronic truck scale is taken as an example. The weighing platform surface 21 is divided into three sections 211, 212, 213. Eight sensors 231-238 are used in the truck scale. Eight sensor supporting points 241-248 are respectively disposed on top of each sensor 231-238. While verifying, eight weighing platform holes 251-258 are defined on the weighing platform surface and adjacent to eight sensor supporting points 241-248. A weighing platform hole 259 is respectively defined in the centers of three weighing platform surface 211-213. A plurality of weighing platform holes are preset on the weighing platform surfaces 21 of the weighing machine. The standard instrument is installed via the holes mentioned above. Namely, the verification is proceeded by the tension framework and the self-adjusting loading-unloading load measuring device 12 under the control of constant-load control device. Referring to FIG. 9*b*, eight tension frameworks 11 and self-adjusting loading-unloading load measuring devices 12 of the present invention are installed on the eight weighing platform holes 251-258 on the weighing platform surface 21 at the same time. The tension framework 11 connected to a ground tension collar 111. At this time, there is still one constant-load control device used for controlling each self-measure loading-unloading load measure device 12.

Referring to FIGS. 9*a* and 9*b*, the operation process of the verification system is described as follows:

1. Installing an independent auxiliary scale verification device without using a weight: The tension frameworks and the self-location loading-unloading load measuring device are installed on each hole (groove) of the weighing platform surface adjacent to each sensor and each center of the weighing platform surface. By combining the tension framework connecting the tension pole (collar) under the hole (groove) and the self-location loading-unloading load measuring device to define a measure system for loading-unloading the weighing platform surface.

2. Zeroing: Loosening the nut fastened on the tension framework so that the weighing machine is not loaded, and the two measure system gauges are zeroed.

3. Pre-pressurizing: Adjusting the nut fastened on the tension framework and loading 200 kg of weight to each self-adjusting loading-unloading load measuring device. After stabilizing for 30 seconds, load each self-adjusting loading-unloading load measuring device to the weighing platform by full scale span. (The loading-unloading mechanism and the sensor automatically adjust their position under the effect of the universal ball bearing so that the pressurizing axial direction of the sensor is parallel to the pressurizing axial direction of the tension pole. The tension framework automatically adjusts the coaxiality of the tension pole and the sensor via the thrust joint bearing disposed on the tension pole and the thrust joint bearing of the pole end.)

4. The accuracy of the zero setting and the tare excluding device and the zero setting before loading: Using ten counterweights with 1 kg of weight and ten counterweights with 200 g of weight to proceed the accuracy of the zero setting and the tare excluding device and the zero setting before loading.

5. The eccentricity test: Control the constant-load control device to apply the load of each self-adjusting loading-unloading load measuring device in accordance with the serial numbers to the eccentric value. Every time the load is applied to the eccentric value, maintaining the load to 30 s, then recording each displaying value of the self-adjusting loading-unloading load measure device and the weighing displaying value of the weighing machine gauge, and proceeding a comparison.

6. The weighing test: Control the constant-load control device to simultaneously apply the load to each self-adjusting loading-unloading load measuring device by levels stipulated in the regulations except for the self-adjusting loading-unloading load measuring device in the center of each weighing platform surface. After applying the load, unload to zero be levels in accordance with the loading points. Every time the load is applied or unloaded to the loading value, maintaining the load to 30 s, then recording the sum of each displaying value of the self-adjusting loading-unloading load measure device and the weighing displaying value of the weighing machine gauge, and proceeding a comparison.

7. The tare excluded test: (1) First, add a predetermined tare weight to the self-adjusting loading-unloading load measuring device in the center of each weight platform surface. After weighing the tare weight, use the constant-load control device to apply the load value to each self-location loading-unloading load measuring device by levels stipulated in the regulations. The load applied to each self-adjusting loading-unloading load measuring device in the center of the weighing platform surface is unchanged. After applying the load, unload to zero be levels in accordance with the loading points. Every time the load is applied or unloaded to the loading value, maintaining the load to 30 s, then recording the sum of each displaying value of the self-adjusting loading-unloading load measure device and the weighing displaying value of the weighing machine gauge, and proceeding a comparison. (2) Add a different predetermined tare weight to the self-adjusting loading-unloading load measuring device in the center of each weight platform surface again. After weighing the tare weight, repeat the steps mentioned above and record the sum of each displaying value of the self-adjusting loading-unloading load measure device and the weighing displaying value of the weighing machine gauge, and proceeding a comparison.

8. The repeatability test: Control the constant-load control device to simultaneously apply the load to each self-adjusting loading-unloading load measuring device by levels stipulated in the regulations except for the self-adjusting loading-unloading load measuring device in the center of each weighing platform surface. After applying the load, unload to zero. Every time the load is applied to the loading value, maintaining the load to 30 s, then recording the sum of each displaying value of the self-adjusting loading-unloading load measure device and the weighing displaying value of the weighing machine gauge, and proceeding a comparison. The steps mentioned above are repeated more than three times.

9. Determine whether the weighing accuracy of the truck scale needs to be adjusted according to the verification result. If it is needed, repeat the verification steps mentioned above until the truck scale meets the verification regulation.

In this embodiment, the present invention is only described in a verification of the truck scale, but the verification device of the present invention is not only adopted in the verification of the truck scale but the verification of the large-scale fixed electronic weighing machine used for different purposes and constructions.

While we have shown and described the embodiment in accordance with the present invention, it should be clear to those skilled in the art that further embodiments may be made without departing from the scope of the present invention.

We claim:

1. A verification system for a large-scale weighing machine;
    wherein, said system comprises at least four tension frameworks penetrating through a weighing platform hole of a weighing machine preset on a weighing platform surface for connecting to a weighing platform foundation and being disposed perpendicular to said weighing platform surface;
    at least four self-adjusting loading-unloading load measuring devices disposed corresponding to said tension frameworks, substituting for a standard counterweight or a substitution of said counterweight to load-unload and load measure said weighing platform surface; said self-adjusting loading-unloading load measuring devices being disposed around said tension frameworks; and
    a constant-load control device connected to a loading-unloading mechanism for allowing said loading-unloading mechanism to maintain constant applied load while loading, wherein said self-adjusting loading-unloading load measuring device includes a self-adjusting loading-unloading mechanism and a high-precision load measuring instrument disposed adjacent to a top side of said loading-unloading mechanism; an accuracy of said high-precision load measuring instrument is at least three times larger than an accuracy of said weighing machine.

2. The verification system for a large-scale weighing machine as claimed in claim 1, wherein said high-precision load measuring instrument includes at least three standard sensors being disposed around and regularly spreading on a center axis of said tension framework, a limiting unit disposed above each standard sensor, and a sensor measure displaying gauge connecting to each standard sensor for displaying a load of a force value of said standard sensor.

3. The verification system for a large-scale weighing machine as claimed in claim 2, wherein said loading-unloading mechanism includes a main oil cylinder and a self-location pressure bearing plate; said main oil cylinder includes an oil cylinder portion defined at an outer side thereof and a piston portion defined at an inner side thereof; said piston portion is disposed adjacent to a bottom side of said sensor; said loading-unloading mechanism further includes a self-adjusting pressure-bearing plate disposed on said weighing platform surface of said weighing machine and sleeved on said tension framework; said self-adjusting pressure-bearing plate is disposed under said main oil cylinder.

4. The verification system for a large-scale weighing machine as claimed in claim 3, wherein said self-adjusting pressure-bearing plate includes a pressure-bearing plate body disposed separate from said oil cylinder portion by a distance and at least three universal ball bearings used for automatically adjusting a pressure-bearing direction so that a bearing axis of said sensor and a bearing axis of said tension pole body are parallel to each other; said universal ball bearing is disposed around and regularly spreads on a center axis of said tension framework, embeds into a top surface of said pressure-bearing plate body, a top side of said universal ball bearing is exposed to contact said oil cylinder portion of said main oil cylinder.

5. The verification system for a large-scale weighing machine as claimed in claim 4, wherein a screw used for adjusting said main oil cylinder is further disposed at said outer side of said main oil cylinder; a top side of said screw supports a top side of said pressure-bearing plate body.

6. The verification system for a large-scale weighing machine as claimed in claim 2, wherein said tension framework includes a ground tension pole or a tension ring embedding in deep of said weighing platform foundation and a tension pole body connecting to said ground tension pole or said tension ring.

7. The verification system for a large-scale weighing machine as claimed in claim 6, wherein said limiting unit is defined as a nut for screwing and sleeved at a top side of said tension pole body.

8. The verification system for a large-scale weighing machine as claimed in claim 6, wherein said tension framework further includes a pressure-bearing pad adjacent to a bottom side of said nut to be sleeved on said tension pole body and a thrust joint bearing adjacent to a bottom side of said pressure-bearing pad to be sleeved on said tension pole body to adjust a coaxiality of said tension pole body and said sensor.

9. The verification system for a large-scale weighing machine as claimed in claim 8, wherein said sensor includes a top base, a bottom base, and a flexible unit disposed between said top base and said bottom base; said top base is disposed adjacent to a bottom side of said thrust joint bearing.

10. The verification system for a large-scale weighing machine as claimed in claim 6, wherein said tension framework includes a self-adjusting coaxiality mechanism for maintaining said coaxiality of said tension pole body and allowing said tension pole body to be perpendicular to said weighing platform surface; said self-adjusting coaxiality mechanism is disposed between said tension pole body and said ground tension pole or said tension ring; said self-adjusting coaxiality mechanism includes a pole-end thrust bearing.

11. The verification system for a large-scale weighing machine as claimed in claim 6, wherein said tension framework includes a height-adjusting tension pole disposed at a part of a bottom side on said tension pole body that is under said weighing platform surface.

12. The verification system for a large-scale weighing machine as claimed in any one of the claims 1 or 2-11, wherein said constant-load control device includes an oil resources mechanism, a constant-load control mechanism, and a computer provided with a constant-load control software.

13. The verification system for a large-scale weighing machine as claimed in claim 12, wherein said oil resources mechanism includes a first servo electric machine, a second servo electric machine, a first servo oil pump, and a second servo oil pump; an input end of said first servo electric machine and an input end of said second servo electric machine are connected with said computer; an output end of said first servo electric machine is connected with an input end of said first servo oil pump; an output end of said second servo electric machine is connected with an input end of said second servo oil pump; said constant-load control mechanism includes a spill valve, an inverting valve, and an electronic stop valve; an input end of said inverting valve is respectively connected with output ends of said first servo oil pump and said second servo oil pump; said inverting valve is further connected to said spill valve; an output end of said inverting valve is connected to said main oil cylinder; at least three sensors are connected to said standard sensor measure displaying gauge; said sensor measure displaying gauge is further connected to said computer; each sensor of said weighing machine is connected to said displaying gauge of said weighing machine; said displaying gauge of said weighing machine is further connected to said computer.

14. A self-adjusting loading-unloading load measuring device for verifying a large-scale weighing machine;
wherein, said self-adjusting loading-unloading load measuring device includes a self-adjusting loading-unloading mechanism substituting for a standard counterweight or a substitution of said counterweight to load-unload a weighing platform surface and a high-precision load measuring instrument disposed adjacent to a top side of said loading-unloading mechanism; an accuracy of said high-precision load measuring instrument is at least three times larger than an accuracy of said weighing machine.

15. The self-adjusting loading-unloading load measuring device for verifying a large-scale weighing machine as claimed in claim 14, wherein said self-adjusting loading-unloading load measuring device penetrates through a weighing platform hole of a weighing machine preset on a weighing platform surface for connecting to a weighing platform foundation and being disposed perpendicular and around to said tension framework of said weighing platform surface.

16. The self-adjusting loading-unloading load measuring device for verifying a large-scale weighing machine as claimed in claim 15, wherein said high-precision load measuring instrument includes at least three standard sensors being disposed around and regularly spreading on a center axis of said tension framework, a limiting unit disposed above said standard sensor, and a sensor measure displaying gauge connecting to each standard sensor and displaying a load of a force value of said standard sensor.

17. The self-adjusting loading-unloading load measuring device for verifying a large-scale weighing machine as claimed in claim 16, wherein said loading-unloading mechanism includes a main oil cylinder and a self-adjusting pressure-bearing plate; said main oil cylinder includes an oil cylinder portion defined at an outer side thereof and a piston portion defined at an inner side thereof; said piston portion is disposed adjacent to a bottom side of said sensor; said loading-unloading mechanism further includes a self-adjusting pressure-bearing plate disposed on said weighing platform surface of said weighing machine and sleeved on said tension framework; said self-adjusting pressure-bearing plate is disposed under said main oil cylinder.

18. The self-adjusting loading-unloading load measuring device for verifying a large-scale weighing machine as claimed in claim 17, wherein said self-adjusting pressure-bearing plate includes a pressure-bearing plate body disposed separate from said oil cylinder portion by a distance and at least three universal ball bearings used for automatically adjusting a pressure-bearing direction so that a bearing axis of said sensor and a bearing axis of said tension pole framework are parallel to each other; said universal ball bearing is disposed around and regularly spreads on a center axis of said tension framework, embeds into a top surface of said pressure-bearing plate body, and a top side of said universal ball bearing is exposed to contact said oil cylinder portion of said main oil cylinder.

* * * * *